United States Patent [19]
Grüning et al.

[11] Patent Number: 5,768,114
[45] Date of Patent: Jun. 16, 1998

[54] CONVERTER CIRCUIT ARRANGEMENT

[75] Inventors: Horst Grüning, Wettingen, Switzerland; Jochen Rees, Waldshut, Germany

[73] Assignee: Asea Brown Boveri Ag, Baden, Switzerland

[21] Appl. No.: 740,686

[22] Filed: Nov. 1, 1996

[30] Foreign Application Priority Data

Nov. 23, 1995 [DE] Germany .................. 195 43 702.0

[51] Int. Cl.$^6$ ........................................ H02H 7/122
[52] U.S. Cl. ........................................ 363/58; 363/137
[58] Field of Search .............................. 363/58, 136, 137, 363/138

[56] References Cited

U.S. PATENT DOCUMENTS

| | | | |
|---|---|---|---|
| 3,388,310 | 6/1968 | Etter | 363/58 |
| 4,058,696 | 11/1977 | Antier et al. | 363/57 |
| 4,376,296 | 3/1983 | Bhagwat et al. | 363/138 |
| 5,345,096 | 9/1994 | Gruning | 257/182 |

FOREIGN PATENT DOCUMENTS

0489945A1  6/1992  European Pat. Off. .
3524522A1  1/1987  Germany .
3801327A1  7/1989  Germany .
WO93/09600 5/1993  WIPO .

OTHER PUBLICATIONS

"An Overview of Low–Loss Snubber Technology for Transistor Converters", Ferraro, IEEE, 1982, pp. 466–477.

"Efficient Snubbers for Voltage–Source GTO Inverters", McMurray, IEEE Transactions on Power Electronics, vol. PE–2, No. 3, Jul. 1987, pp. 264–272.

"GTO–Pulswechselrichter mit Wirkstromregelung fur Schienenfahrzeuge mit Gleichspannungsspeisung", Beck, Elektrische Bahnen eb, Mar. 1988, pp. 81–85.

"Some Aspects of the Circuit Design of High Power GTO Converters", Runge, et al., EPE, 1989, pp. 1555–1560.

Primary Examiner—Peter S. Wong
Assistant Examiner—Shawn Riley
Attorney, Agent, or Firm—Burns, Doane, Swecker & Mathis, L.L.P.

[57] ABSTRACT

A converter circuit arrangement is disclosed. As a result of the fact that GTOs are hard driven, reverse-parallel connected diodes have a reverse current response dV/dt of 2 kV/μs to 10 kV/μs and a low-inductance freewheeling circuit is provided between the DC voltage source and the GTOs, the GTOs and the reverse-parallel connected diodes can be operated without a protective circuit.

7 Claims, 4 Drawing Sheets

CONVERTER CIRCUIT ARRANGEMENT

BACKGROUND OF THE INVENTION

1. Field of the Invention

The invention relates to the field of power electronics. It is based on a converter circuit arrangement.

2. Discussion of Background

Such circuit arrangements are described, for example, in the article "Efficient Snubbers for Voltage-Source GTO Inverters" by W. McMurray, IEEE Transactions on Power Electronics, Vol. PE-2, No. 3, July 1987. This relates to converter circuit arrangements having at least two series-connected GTOs, which are connected to a DC voltage source and, with the common node of the series circuit, form a load connection. In addition, so-called reverse-parallel connected diodes are provided in parallel with the GTOs and carry the current flow after commutation. A special circuit or a "snubber" must be provided in order to protect the GTOs against excessive current and voltage gradients during switching. According to the prior art, as is presented in the said article, this circuit comprises a comparatively complex network of inductances, capacitors, resistors and diodes, which network is arranged in parallel with and in series with the GTOs and reverse-parallel connected diodes. Other special circuit variants are disclosed in the article "An Overview of Low-Loss Snubber Technology for Transistor Converters" by A. Ferraro, IEEE 1982, pages 466–467.

The European Patent Applications EP-A1-0 489 945 and WO-93/09600 describe the so-called "hard driving" of a GTO, and circuit arrangements are specified for corresponding drive units. In the context of these two European Patent Applications, the term "hard driving" means the GTO being driven with a gate current which is designed such that the turn-off gain IA/IGpeak is considerably less than 3, and such that the result is an anode voltage rise of at least 1 kV/µs. In the context of the present invention, this hard driving is significant, and the content of the European Patent Applications mentioned above should therefore be expressly recorded at this point.

The GTO phase modules built according to the above prior art—this is understood to include that part of a converter which is required for one phase of an AC voltage system—still have a comparatively high level of complexity, however. The reasons for this are:

- the high level of protective circuits which are required to limit the current and voltage gradient when the GTOs and diodes are being switched on and off;
- the interaction between the special circuit measures (capacitors for dV/dt limiting form tuned circuits with the inductors for dI/dt limiting);
- the influence of disturbances from the supplying intermediate circuit on the respective phase by means of the displacement currents in the dV/dt capacitors, which can lead to disturbing charge carrier injections into the snubber diodes;
- the linking of the characteristics of a large number of individual components to form a complex overall structure (phase module, converter), in which the characteristics of an individual element (GTO, the drive for the GTO, diode, snubber, parasitics in the intermediate circuit) are in general not changed without endangering other elements.

GTO phase modules are therefore large, costly and subject to intensive development. Only in a few cases has it been possible to satisfy effectively the customer desire for modularity and simple service, and to manage with an acceptable additional complexity.

German Patent Application P 195 23 095.7, which was not disclosed prior to this, succeeded in reducing the size of the special circuit network. GTOs such as those described in U.S. Pat. No. 5,345,096 are used, in particular, there. However, a protective capacitor which limits the voltage rise still has to be provided per path. Furthermore, however, the capacitors are comparatively expensive and also occupy a large amount of space. A circuit arrangement in which a special circuit network can be entirely dispensed with would therefore be desirable.

SUMMARY OF THE INVENTION

Accordingly, one object of the invention is to provide a novel converter circuit arrangement which can be constructed to be modular, cost-effective and small. Parasitic effects of the described type should be largely precluded by the circuit from the start, so that the development risk and costs are limited to an extent as is currently already known with IGBT converters in the lower voltage and power classes. In particular, it should be possible to operate the semiconductor power switches without any protective circuit network.

This object is achieved in the case of a converter circuit arrangement of the type mentioned initially by the features in the first claim. The essence of the invention is thus that

- the thyristors which can be turned off are hard driven. In particular, the ratio of the anode current $I_A$ to a maximum gate current $I_{Gpeak}$, $I_A/I_{Gpeak}$ should be less than or equal to 1, and the gate current should rise quickly in such a manner that the maximum value $I_{Gpeak}$ is reached within a rise time tr of less than or equal to 2 µs, preferably less than or equal to 1 µs;
- a total inductance $L_G$ of the drive circuit of each GTO must be selected to be so small that $L_G \leq V_{GR}/(I_{Gpeak}/tr)$, $V_{GR}$ corresponding to the reverse blocking voltage of the gate;
- a freewheeling circuit is provided between the DC voltage source and the series circuit formed by the thyristors which can be turned off; and that
- the diodes which are connected in reverse-parallel with the thyristors have a reverse current response with a voltage/time differential dV/dt of 2 kV/µs to 10 kV/µs.

This combination of measures makes it possible to specify a circuit which can operate without the previously necessary snubber capacitors. In consequence, components are saved. This makes possible cost reduction, and requires a smaller physical volume. In addition, the losses in the converter are reduced by the absence of stored energy. The losses on part load are approximately proportional to the load current with the circuit according to the invention, and the possibilities of parasitic influences are precluded. In consequence, lower development costs, a lower risk and a high level of standardization are possible.

The freewheeling circuit comprises a capacitor, an inductance, a diode and a resistor, the capacitor being connected in parallel with the series circuit of the thyristors which can be turned off.

Various exemplary embodiments for the freewheeling circuit are specified. In the simplest case, one freewheeling circuit is provided per path. Parts or even the entire freewheeling circuit can also be used for a plurality of paths. This results in circuits which are distinguished by an extremely compact design.

Other exemplary embodiments result from the corresponding dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
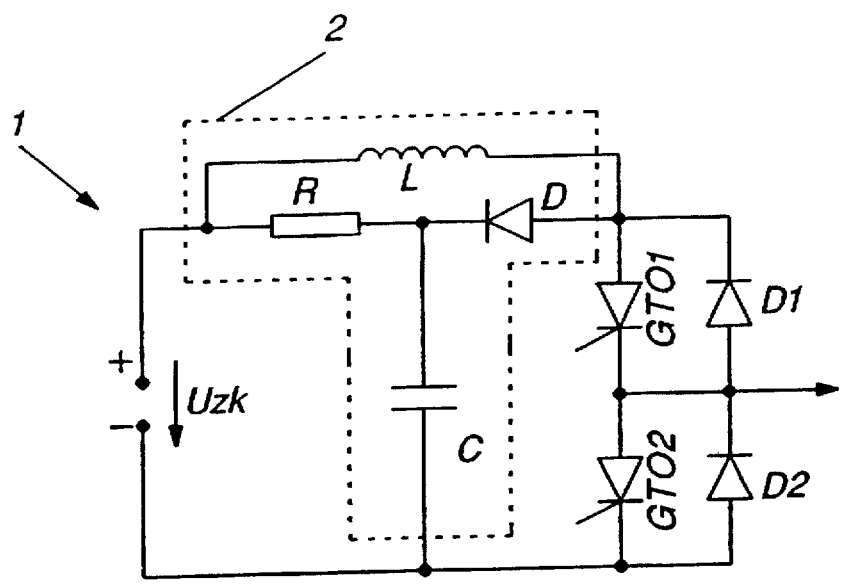
FIG. 1 shows an equivalent circuit of a converter circuit arrangement according to the invention.

Referring now to the drawings, wherein like reference numerals designate identical or corresponding parts throughout the several views, FIG. 1 shows a path in a converter circuit arrangement 1 according to the invention. Two turn-off thyristors, which are connected in series, are designated GTO1 and GTO2. The central, common node forms a phase or load connection to which, for example, the phase connections of an asynchronous motor can be connected. A freewheeling circuit 2 is arranged between the turn-off thyristors and a DC voltage source which is formed, in particular, by a DC voltage intermediate circuit Uzk of a converter.

The GTOs of the circuit according to the invention are hard driven. It has been possible to show that, as a result of the hard driving, it is possible to achieve the defined turn-off values for most applications in operation without any special circuit capacitors, that is to say capacitors which limit the voltage rise, as a result of the thermal capabilities of the GTOs (heat production and dissipation).

In contrast to the invention, protective capacitors are always required in parallel with the GTOs in the prior art.

In contrast to EP-A1-0 489 945, which was mentioned initially and where operation free of special circuits is still not possible, the ratio of the anode current $I_A$ to a maximum gate current $I_{Gpeak}$, $I_A/I_{Gpeak}$ should be less than or equal to 1, and the gate current is intended to rise quickly such that the maximum value $I_{Gpeak}$ is reached within a rise time tr of less than or equal to 2 µs, preferably less than or equal to 1 µs.

To this end, a total inductance $L_G$ of the drive circuit of each GTO must also be selected to be sufficiently small that $L_G \leq V_{GR}/(I_{Gpeak}/tr)$, $V_{GR}$ corresponding to the reverse blocking voltage of the gate. For high-current GTOs, this aim is achieved, for example, with a design as is taught in the initially mentioned U.S. Pat. No. 5,345,096.

Overall, this type of drive results in the cathode current reaching the value zero during turn-off before the anode voltage rises.

Figure 2:
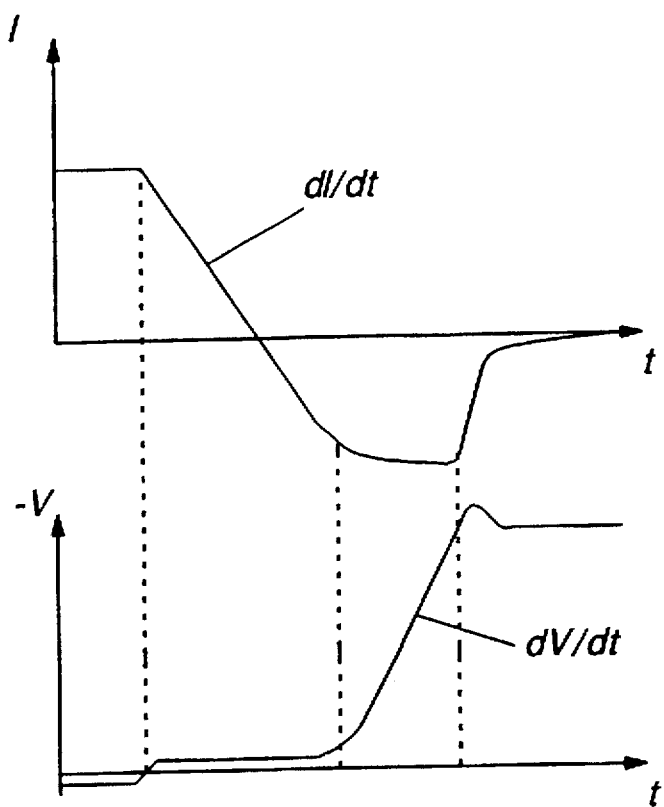
FIG. 2 shows the current and voltages profile of the reverse response of the reverse-parallel connected diodes.

Reverse-parallel connected diodes D1, D2 are provided in reverse-parallel with the GTOs. These diodes can also be integrated in the GTO in the case of a reverse-conducting GTO. These diodes require that the dI/dt be limited, this being achieved in a known manner by the inductance L. The diodes must commutate off with respect to this inductive load, once again, without a snubber capacitor or special circuit (reverse current response "reverse recovery"). The diodes have a reverse current response as is illustrated at the top in FIG. 2. When the voltage is transferred, the current initially continues to flow, on the one hand, for a certain time in the reverse direction. The voltage does not rise until then, with a certain edge gradient dV/dt. Specially trimmed diodes (for example by lifetime design by means of proton or helium irradiation) are therefore used for the invention, and are preferably set such that their dV/dt is in the range from 2 kV/µs ... 10 kV/ms when commutating off under full load (See FIG. 2).

Particularly when designing for low switching losses, the snubber-free operation of the GTOs and the reverse-parallel connected diodes leads to a high dV/dt and correspondingly fast off-commutation processes with a high dI/dt. An extremely low-inductance design is therefore necessary (total parasitic circuit inductance=100 ... 200 nH). The intermediate circuit and freewheeling resistors do not in general allow such a low-inductance design. According to the invention, a circuit is therefore necessary which allows the introduction of a low-inductance overshoot. The capacitance of the overshoot capacitor C is in this case chosen such that it effectively limits the transient overvoltages but does not significantly influence the free-running of the inductance. A capacitor where C=1UF to 3 µF thus results for most applications in the region of a turn-off current of 3 kA.

A low-inductance fast freewheeling circuit 2 is therefore provided between the DC voltage source Uzk and the switches. In the simplest case (FIG. 1), this circuit comprises a capacitor C which is arranged in parallel with the GTOs, and a series circuit which is in parallel with an inductance and is formed by a resistor R and a diode D, the resistor R and the capacitor C being connected on one side to the cathode of the diode and on the other side to the positive connection or negative connection, respectively, of the DC voltage source.

Figure 3:
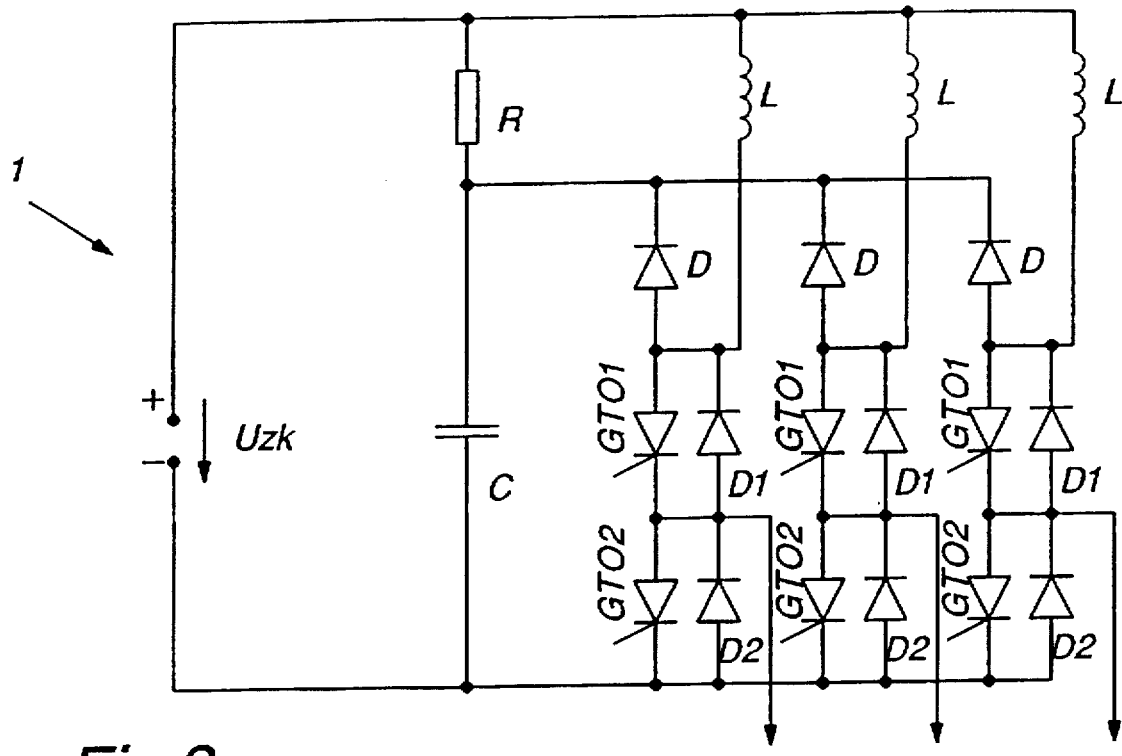
FIG. 3 shows a second embodiment of the invention.

FIG. 1 illustrates only one path of a converter. In general, a plurality of paths or phase modules are provided, and one freewheeling circuit is assigned to each phase module. Particularly preferred embodiments allow these elements, furthermore, to use a plurality of phase modules jointly:

In FIG. 3, the freewheeling resistor R and the overshoot capacitor C are used jointly by a plurality of phase modules. However, one inductance is provided for each path. This embodiment has the following advantages:

Smaller number of components

The heat is concentrated in one resistor, that is to say reduced cooling capacity particularly in the case of water cooling, increased reliability in terms of the water supply and resistor design (more robust).

Compact modular construction.

Figure 4:
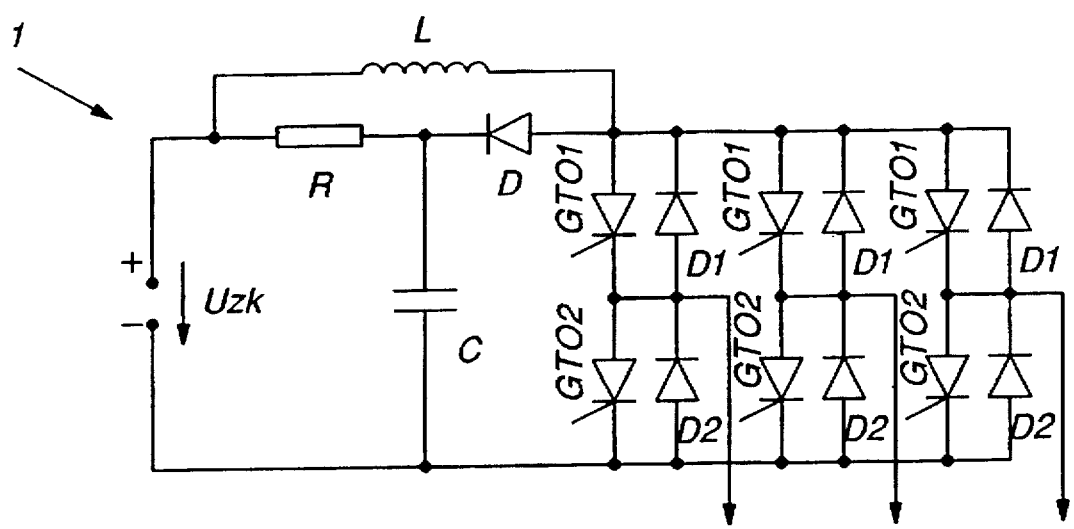
FIG. 4 shows a third embodiment of the invention.

In the embodiment according to FIG. 4, the inductance L, the resistor R, the overshoot capacitor C and the diode D are used jointly. The advantages of this circuit are:

Extremely low cost

Compact design

Minimal weight and physical volume (only one inductance, minimal interconnections).

However, in the case of this circuit, the switching process for a predecessor should be completed, before the switching of a phase, to such an extent that only a small current is still flowing in the freewheeling resistor R.

Figure 5:
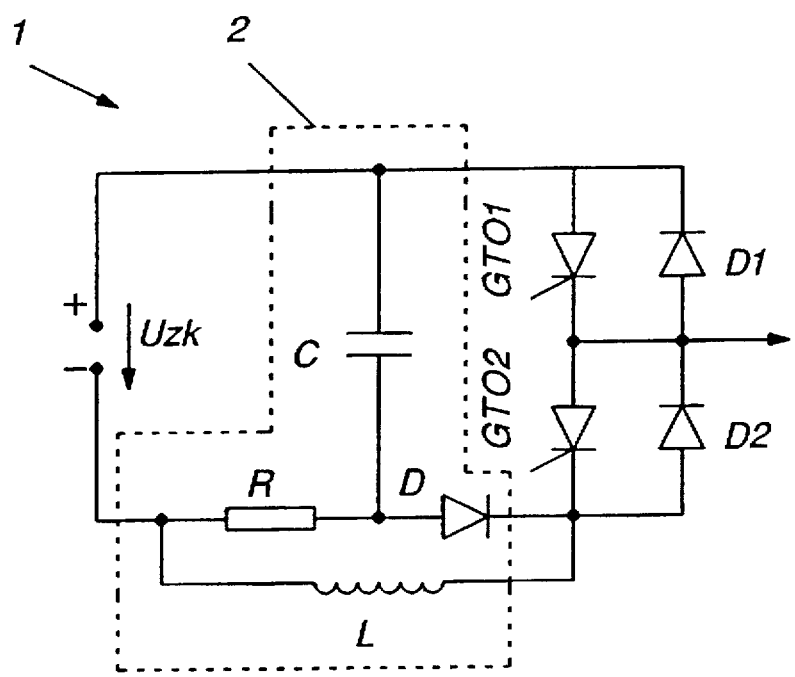
FIG. 5 shows a variant of the embodiment according to FIG. 1.

Alternatively, as is shown by way of example in FIG. 5 for one path, the freewheeling circuits can be arranged between the negative pole of the DC voltage intermediate circuit and the turn-off thyristors. The diode D must then be used with reverse polarity. The remainder of the circuit is symmetrical, as a mirror image.

Overall, the measures according to the invention make it possible to build a converter which manages without any protective circuit for the turn-off thyristors and reverse-parallel connected diodes.

Figure 6:
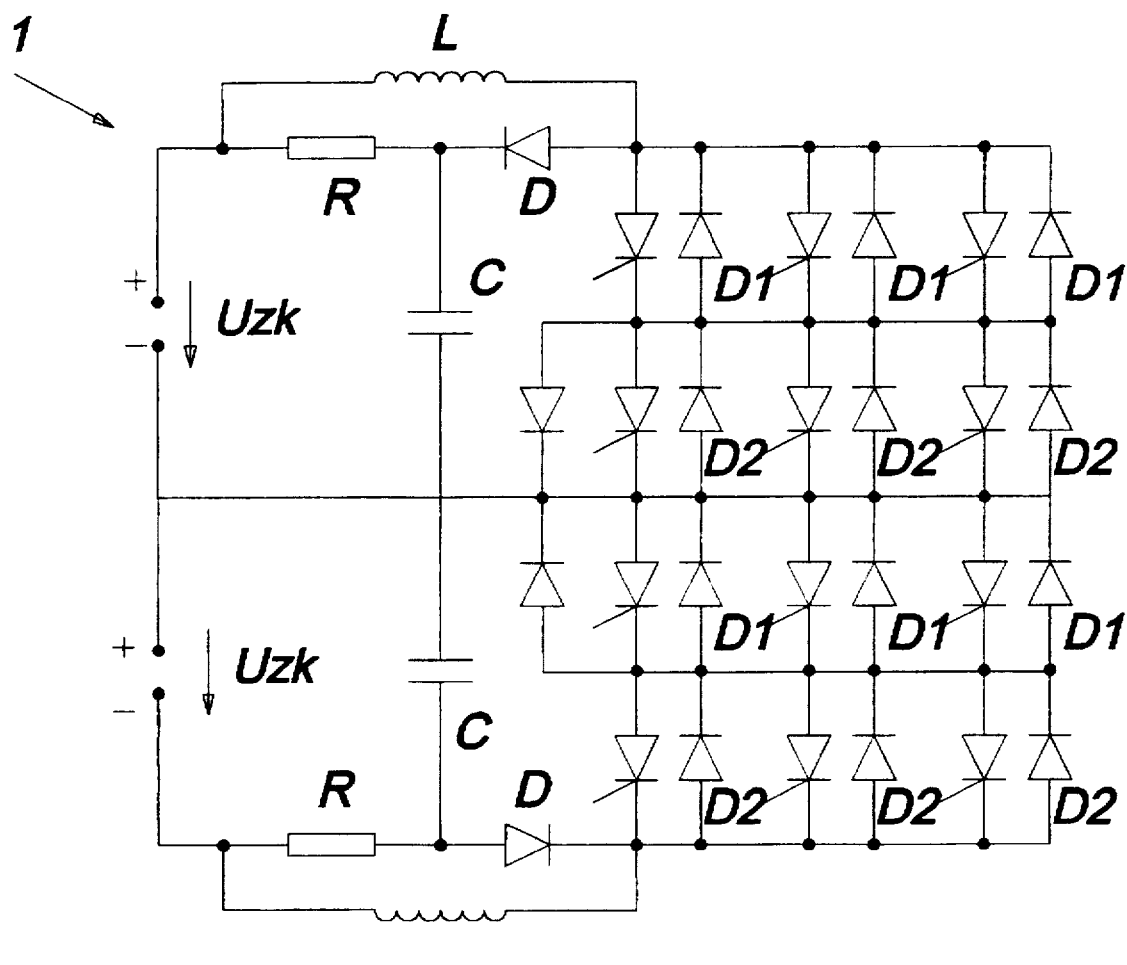
FIG. 6 shows a variant embodiment of the invention.

The converter may also have the form of a three-point inverter as illustrated in FIG. 6. In this case, at least four switches are provided per path, and not only the positive and the negative intermediate circuit voltage but also zero volts on the load connection, which in turn is formed by the central common node of the series circuit of the switches, can be switched by appropriate circuitry of the switches and of the DC voltage intermediate circuit. The function and the design of a three-point inverter are known from a large number of literature references and do not need to be explained in more detail here.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A converter circuit arrangement having at least one path with an even number of series-connected thyristors which can be turned off, and having reverse-parallel connected diodes which are connected in reverse-parallel with the thyristors, the path of each path being connected to a DC voltage source and a central, common node of the path or of each path forming a load connection, wherein a DC voltage source and a central, common node of the path or of each path forming a load connection, wherein the thyristors which can be turned off are hard driven, to be precise in such a manner that the ratio of an anode current $I_A$ to a maximum gate current $I_{Gpeak}$, $I_A/I_{Gpeak}$ is less than or equal to 1, and the gate current rises quickly in such a manner that $I_{Gpeak}$ is reached within a rise time tr of less than or equal to 2 µs;

a total inductance $L_G$ of the driven circuit of each thyristor is selected to be sufficiently small that $L_G \leq V_{GR}/(I_{Gpeak}/tr)$, $V_{GR}$ corresponding to a reverse blocking voltage of the gate;

a freewheeling circuit is provided between the DC voltage source and the series circuit formed by the thyristors which can be turned off; and the reverse-parallel connected diodes have a reverse current response with a voltage/time differential dV/dt of 2 kV/µs to 10 kV/µs.

2. The circuit arrangement as claimed in claim 1, wherein a freewheeling circuit is provided for each path and the freewheeling circuit comprises a capacitor, a resistor, a diode and an inductance, the resistor and the diode being connected in series and being connected between the positive pole of the DC voltage source and the series circuit of thyristors which can be turned off, the inductance being connected in parallel with the series circuit formed by the resistor and the diode, and the capacitor being connected on one side to the common node of the series circuit formed by the resistor and the diode, and being connected on the other side to the negative pole of the DC voltage source.

3. The circuit arrangement as claimed in claim 2, wherein at least 3 paths are provided and the resistor and the capacitor of the freewheeling circuits in the paths are combined to form in each case one common component.

4. The circuit arrangement as claimed in claim 3, wherein the inductances of the freewheeling circuits of the paths are also combined to form a common component.

5. The circuit arrangement as claimed in claim 2, wherein the freewheeling circuit is arranged between the negative pole of the DC voltage source and the series circuit formed by the thyristors which can be turned off, the cathode of the diode facing the thyristors which can be turned off.

6. The circuit arrangement as claimed in claim 1, wherein each path has at least four thyristors, which can be turned off, and reverse-parallel connected diodes, and wherein the thyristors are connected to the DC voltage source like a three-point inverter.

7. The circuit arrangement as claimed in claim 1, wherein said rise time tr is less than or equal to 1 µs.

* * * * *